(12) United States Patent
Crabtree et al.

(10) Patent No.: US 8,672,033 B2
(45) Date of Patent: Mar. 18, 2014

(54) METHOD OF IMPROVING PERFORMANCE AND EFFICIENCY OF WELLBORE PUMP FOR HYDROCARBON PRODUCTION

(75) Inventors: Michael John Crabtree, Tyne & Wear (GB); Philip Fletcher, Cambridgeshire (GB); Jeffrey Forsyth, Inverurie (GB)

(73) Assignee: Oilflow Solutions Holdings Limited, Lancashire (GB)

( * ) Notice: Subject to any disclaimer, the term of this patent is extended or adjusted under 35 U.S.C. 154(b) by 232 days.

(21) Appl. No.: 12/452,079

(22) PCT Filed: Jun. 3, 2008

(86) PCT No.: PCT/GB2008/001868
§ 371 (c)(1),
(2), (4) Date: Mar. 19, 2010

(87) PCT Pub. No.: WO2008/152357
PCT Pub. Date: Dec. 18, 2008

(65) Prior Publication Data
US 2010/0186966 A1 Jul. 29, 2010

(30) Foreign Application Priority Data
Jun. 15, 2007 (GB) .................................. 0711635.3

(51) Int. Cl.
*E21B 43/16* (2006.01)
*E21B 37/00* (2006.01)

(52) U.S. Cl.
USPC ........ 166/310; 166/263; 166/279; 166/305.1; 166/312; 166/371

(58) Field of Classification Search
USPC ........................ 166/263, 279, 305.1, 312, 371
See application file for complete search history.

(56) References Cited

U.S. PATENT DOCUMENTS

| | | | |
|---|---|---|---|
| 3,016,833 A | | 1/1962 | Creed |
| 5,996,691 A | * | 12/1999 | Norris et al. ............. 166/250.03 |
| 6,138,755 A | * | 10/2000 | Swartwout ................. 166/250.1 |
| 6,343,653 B1 | * | 2/2002 | Mason et al. ................. 166/312 |
| 6,481,499 B2 | * | 11/2002 | Lopes ....................... 166/250.03 |
| 6,889,765 B1 | * | 5/2005 | Traylor ...................... 166/105.5 |
| 2002/0121376 A1 | | 9/2002 | Rivas et al. |
| 2007/0042911 A1 | * | 2/2007 | Fletcher ........................ 507/203 |

FOREIGN PATENT DOCUMENTS

| WO | WO 2005/040669 A1 | 5/2005 |
|---|---|---|
| WO | WO 2006/106300 A1 | 10/2006 |

\* cited by examiner

*Primary Examiner* — Zakiya W Bates
*Assistant Examiner* — Silvana Runyan
(74) *Attorney, Agent, or Firm* — Nixon & Vanderhye P.C.

(57) ABSTRACT

Method of improving performance or efficiency of a wellbore pump associated with a wellbore and/or for increasing the rate of production of reservoir fluid from a reservoir, in which a wellbore pump is arranged to pump wellbore fluid within the wellbore to a surface. The method includes (a) selecting a wellbore which includes an associated wellbore pump associated with a production tube and arranged within a casing. An annulus is defined between the casing and the pump/production tube, the annulus including reservoir fluid which has a hydrostatic head which is at least 15 m above the level of an inlet of the wellbore pump, and (b) contacting a reservoir fluid in the annulus upstream of an inlet of the wellbore pump with a treatment formulation. The treatment formulation has a first polymeric material which includes —O— moieties pendent from a polymeric backbone thereof, and the first polymeric material is optionally cross-linked.

18 Claims, 2 Drawing Sheets

METHOD OF IMPROVING PERFORMANCE AND EFFICIENCY OF WELLBORE PUMP FOR HYDROCARBON PRODUCTION

This application is the U.S. national phase of International Application No. PCT/GB2008/001868 filed 3 Jun. 2008 which designated the U.S. and claims priority to British Application No. 0711635.3 filed 15 Jun. 2007, the entire contents of each of which are hereby incorporated by reference.

This invention relates to hydrocarbons and particularly, although not exclusively, relates to the production of hydrocarbons. Preferred embodiments aim to improve performance of pumps associated with a wellbore and/or increase the rate of production of hydrocarbons.

BACKGROUND OF THE INVENTION

During the process of hydrocarbon production under the natural geothermal pressure of a reservoir, the reservoir pressure will deplete. Eventually, the pressure in the reservoir may become too low to force fluid from the producing zone to the surface and artificial-lift may be required. In some cases, artificial-lift techniques are employed at the very onset of production, depending upon the overall techno-economic characteristics of the reservoir.

An artificial-lift system is defined as any system which adds energy to the fluid column in a wellbore, with the objective of initiating and improving production from the well. Artificial-lift methods fall into two groups, those that use gas and those that use pumps.

In a gas lift method, gas is injected into a well through valves placed along the wellbore at strategic points. The gas aerates fluid to make it less dense and consequently the reservoir pressure becomes sufficient to lift the oil and force it from the wellbore.

Methods that use pumps use a surface power source to drive a downhole pump assembly. The objective is to generate a large positive pressure gradient between the exit point of the pump and the surface, in order to increase the rate of fluid transport to the surface. In addition, downhole pumps serve to reduce pressure between the pump entry point and the wellbore interface with the reservoir. This increases the differential pressure between the reservoir and the wellbore, which in turn may increase the rate of fluid flow into the wellbore, providing the reservoir is compliant.

In its passage from a reservoir to the surface, fluid including hydrocarbons is arranged to flow through various orifices, openings or other constrictions. For example, when a pump is arranged in the wellbore, the fluid must pass through the inlet opening of the pump before it is lifted to the surface. Also, in some cases, wellbores may include associated sand control barriers (also known as "sand packs", "sand screens" or "gravel packs"), upstream of a wellbore pump. The sand control barriers are provided for maintaining structural integrity of the wellbore in the absence of casing whilst still allowing fluid to pass from the reservoir into the wellbore and also control the migration of formation sand into the wellbore pumps and/or surface equipment. However, sand control barriers can act as a significant force working against the passage of fluid into the wellbore.

Disadvantageously, the passage of fluid including hydrocarbons through constrictions as described may produce a significant positive pressure which may reduce the rate of flow of fluid from the reservoir to the wellbore and/or into the wellbore pump.

It is an object of the present invention to address the above described problems.

SUMMARY OF THE INVENTION

According to a first aspect of the invention, there is provided a method of improving performance or efficiency of a wellbore pump associated with a wellbore and/or for increasing the rate of production of reservoir fluid from a reservoir, wherein a wellbore pump is arranged to pump wellbore fluid within the wellbore to a surface, said method comprising the steps of:

(a) selecting a wellbore which includes an associated wellbore pump; and (b) contacting a reservoir fluid upstream of an inlet of the wellbore pump with a treatment formulation, wherein said treatment formulation comprises a first polymeric material which includes —O— moieties pendent from a polymeric backbone thereof, wherein the first polymeric material is optionally cross-linked.

Surprisingly, it has been found that use of the treatment formulation appears to facilitate passage of reservoir fluid including liquid hydrocarbons through constrictions by lowering the surface tension and/or frictional forces between the reservoir fluid and walls which define constrictions. The walls may be of the near wellbore pores, residing in the reservoir; or may be walls of production tubing from the pump outlet to the surface; or may be walls of orifices of the pump inlet or outlet; or may be internal walls within pumps themselves; or may be within sand control barriers. Such reduced forces may facilitate passage of reservoir fluid and consequently may improve performance or efficiency of a pump associated with a wellbore. Furthermore, use of the treatment formulation may advantageously allow the rate of flow of fluid passing from the reservoir into the wellbore to increase and consequently the barrels of oil per day (BOPD) may be increased which is economically and commercially very significant.

In one embodiment, use of the treatment formulation may simply reduce the torque on the wellbore pump. However, in a second embodiment, the height of the head of reservoir fluid in a wellbore annulus may be lowered and, consequently, the back pressure due to the head will be reduced and the reservoir may then yield more oil. In a third embodiment in which a wellbore includes an associated sand control barrier, use of the treatment formulation may facilitate flow of oil through the barrier, reduce back pressure and the reservoir may therefore yield more oil. In a fourth embodiment, the method may be used to increase the rate of production of a non-producing or "dry" well.

Said reservoir fluid suitably comprises liquid hydrocarbons, for example oil such as heavy oil. The method may advantageously be used to increase the rate of production of the aforementioned liquid hydrocarbons.

In step (b), said reservoir fluid is preferably initially contacted with said treatment formulation in said wellbore.

In one embodiment, said wellbore may have a maximum deviation in the range 0 to 60°. The maximum deviation may be in the range 0 to 30° C. Said wellbore may extend substantially vertically. In another embodiment, the invention may be used for increasing the rate of production of reservoir fluids from horizontal wells or wells by having wellbores which deviate more than 60°.

Prior to contact with said reservoir fluid, said treatment formulation is suitably above the surface of the ground in which said wellbore is defined. It may be contained within a receptacle. In step (b), said treatment formulation is preferably caused to move from a first position, spaced from the inlet of the wellbore pump, towards a second position defined by the inlet of the wellbore pump. Said treatment formulation is preferably arranged to move along a fluid flow path which extends within the wellbore (preferably within an annulus of the wellbore) on moving towards said second position. Preferably, said fluid flow path extends between a first region of the wellbore adjacent an upper end of the wellbore and a second region of the wellbore which is suitably below the first region, preferably at or adjacent said inlet of said pump. Preferably, substantially the entirety of said fluid flow path extends within the wellbore. Said fluid flow path may extend at least 10 m, preferably at least 30 m.

Preferably, in step b), a force is incident upon the treatment fluid to cause it to move between said first and second positions. Said force could be provided, at least in part, by a pump means. Preferably, a major amount of said force is provided by gravity. Suitably, at least 60%, preferably at least 70%, more preferably at least 80%, especially at least 90% of said force is provided by gravity. In a preferred embodiment, treatment formulation is introduced into said wellbore and allowed to fall under gravity thereby to move towards the wellbore pump. In this case, suitably, no pump means may be used to speed up flow of the treatment formulation within the wellbore.

In a first preferred embodiment, in step (b), said treatment formulation may be initially contacted with reservoir fluid in the annulus of the wellbore. The treatment formulation may, after initial contact, be allowed to fall under gravity and move towards the inlet of the wellbore pump. When the annulus does not include a packer (or other interruption therein), the treatment formulation may be introduced at or adjacent the top of the annulus. When the annulus includes a packer (or other interruption), the treatment formulation may be introduced beyond the packer so that it is free to move (suitably under gravity) towards the inlet of the wellbore pump. In this regard, a conduit may be defined through the packer (or other interruption) to allow treatment formulation to traverse the packer.

Preferably, treatment formulation is initially contacted with reservoir fluid at a position which is at least 5 m above the height of the inlet of the wellbore pump. If the wellbore includes more than one pump, the referenced pump is suitably the lowermost one.

In a second less preferred embodiment, a conduit for containing treatment formulation may extend to a position adjacent the inlet of the pump for delivering formulation directly to a region around the inlet. The conduit may be terminated with a delivery device having a plurality, preferably a multiplicity, of outlets for directing streams of treatment formulation to the region around the inlet.

Said treatment formulation may be introduced into the wellbore from an input position, wherein the input position is on an imaginary vertical line which is spaced horizontally from the inlet of the wellbore pump by a distance of less than 500 m, preferably less than 50 m, more preferably less than 10 m. Thus, in the first embodiment described, the first position may be the position wherein treatment formulation initially contacts reservoir fluid (and the imaginary vertical line may extend vertically downwards from that position). In the second embodiment, the first position may be defined by an outlet of the delivery device.

A filtration device, for example a sand control barrier, may be associated with the wellbore, upstream of the wellbore pump. The method may particularly advantageously be applied to such arrangements, potentially leading to an increase in BOPD of a well.

Said wellbore pump may be of any type. Preferably, said wellbore pump is selected from a progressing cavity pump (PCP) (also known as an eccentric screw pump), a beam pump (also known as a rod pump, walking beam pump and a suction rod pump) and a centrifugal pump for example an electrical submersible pump (ESP).

A PCP is a type of pump which transfers fluid via a sequence of small discrete cavities, which move through the pump. These cavities carry the fluid. The PCP is comprised of a helix shaped metal rotor, which turns eccentrically inside a helix shaped stator. The exact shape and pitch of the helices on both rotor and stator, the number of cavities per length of pump and the size of the gaps between rotor and stator are all optimized for well conditions and pump size.

Beam pumps are simple devices containing a plunger and a pair of valves on the end of a reciprocating beam (sucker rod), which travels longitudinally in the production tubing of a well. Such a device is driven by a surface power source, commonly an electric motor or a gas or diesel engine. This turns a pair of cranks which by their action converts the rotary mechanism of the motor to the vertical reciprocating motion of the beam. The result is a characteristic nodding motion. The downhole plunger and valve assembly convert the reciprocating motion to vertical fluid movement. Essentially, during the downstroke of the beam the plunger is filled with fluid and during the upstroke of the beam the fluid is delivered to the front surface of the pump.

The method may be used particularly advantageously with the aforementioned wellbore pumps because it may allow performance and/or efficiency of the pumps to be increased and/or may reduce wear and/or service intervals of the pumps.

Preferred pumps may, in some cases, be PCPs or beam pumps. However, in some cases, the invention may advantageously be applied to situations wherein EPSs are associated with wellbores. ESPs are generally relatively cheap but are not generally usable to transport heavy oils. However, use of the present invention may enable such pumps to be used, even to transport relatively heavy oils to the surface.

In step (a), the method may comprise selecting a wellbore having a wellbore pump of the type described.

In step (a), the method may comprise selecting a wellbore having a hydrostatic head in the annulus which is at least 15 m, preferably at least 30 m above the level of the inlet of said wellbore pump. The head may be less than 300 m above said level.

In step (a), the method may comprise selecting a wellbore associated with a reservoir which is capable of yielding more oil if the rate of flow through the wellbore can be increased. The method may have the effect of stimulating the reservoir so that it yields more oil.

In step (a), the method may comprise selecting a wellbore having a wellbore pump having a volumetric efficiency of less than 60%.

In step (a), the method may comprise selecting a wellbore wherein oil in the wellbore fluid has a viscosity in the range 2000 cp to 50,000 cp, preferably 5000 cp to 50,000 cp, measured at the reservoir temperature.

In the method, the treatment formulation may be introduced into a region upstream of the wellbore pump (e.g. introduced into the wellbore and/or the annulus thereof) at a rate of at least 0.1 liters of treatment formulation per minute. The rate may be 500 liters per minute or less. In preferred embodiments, the rate may be at least 0.25 liters/minute; and suitably 25 liters/minute or less.

In the method, the ratio of the volume of reservoir fluid to the volume of treatment formulation may be in the range of 60:40 (reservoir fluid:formulation) to 95:5, preferably in the range of 70:30 (reservoir fluid:formulation) to 85:15.

The method of the first aspect suitably includes the step of operating the wellbore pump to draw fluid through the wellbore, suitably to the surface.

Preferably, in the method, the rate of recovery of liquid hydrocarbons from the wellbore after contact with said treatment formulation is greater than the rate of recovery of liquid hydrocarbons before contact with said treatment formulation.

Preferably, the method comprises causing or allowing liquid hydrocarbon to separate from other components (e.g. water) of the fluid collected at the surface of the wellbore.

Said treatment formulation suitably has a substantially Newtonian viscosity at 25° C. of greater than 0.75 cP, suitably greater than 0.9 cP. Said treatment formulation preferably has a viscosity under the conditions described of not greater than 10 cP, preferably of 5 cP or less, more preferably of 2 cP or less. However, in the embodiment of the fourth aspect described herein, the viscosity may be higher.

Said treatment formulation may include at least 70 wt %, preferably at least 80 wt % water. The amount of water may be 99.9 wt % or less.

Said treatment formulation suitably includes at least 0.1 wt % of said optionally cross-linked first polymeric material. Said formulation suitably includes less than 5 wt %, preferably less than 3 wt %, more preferably less than 2 wt %, especially less than 1 wt % of said optionally cross-linked first polymeric material.

Said treatment formulation may include at least 30 parts by weight (pbw) of water to each pbw of said optionally cross-linked polymeric material.

In a preferred embodiment, said treatment formulation includes:
0.1 to 3 wt % (preferably 0.1 to 0.5 wt %) of said optionally cross-linked polymeric material;
0 to 20 wt % of dissolved or dispersed components in addition to said optionally cross-linked polymeric material (e.g. salts found in sea water);
77 to 99.9 wt % water.

In an especially preferred embodiment, said treatment formulation includes:
0.1 to 0.5 wt % of said optionally cross-linked polymeric material;
0 to 10 wt % of said dissolved or dispersed components;
89.5 to 99.9 wt % water.

Water for use in the treatment formulation may be derived from any convenient source. It may be potable water, surface water, sea water, aquifer water, deionised production water and filtered water derived from any of the aforementioned sources.

Suitably, said optionally cross-linked first polymeric material makes up at least 90 wt %, preferably at least 95 wt %, more preferably at least 98 wt %, especially at least 99 wt % of active materials in said treatment formulation. In the most preferred embodiment, preferably substantially the only active material in said treatment fluid formulation is said optionally cross-linked first polymeric material.

Said optionally cross-linked first polymeric material is preferably soluble in water at 25° C. Preferably, said treatment formulation comprises a solution of said optionally cross-linked first polymeric material.

Said polymeric backbone of said first polymeric material preferably includes carbon atoms. Said carbon atoms are preferably part of —$CH_2$— moieties. Preferably, a repeat unit of said polymeric backbone includes carbon to carbon bonds, preferably C—C single bonds. Preferably, said first polymeric material includes a repeat unit which includes a —$CH_2$— moiety. Preferably, said polymeric backbone does not include any —O— moieties, for example —C—O— moieties such as are found in an alkyleneoxy polymer, such as polyethyleneglycol. Said polymeric backbone is preferably not defined by an aromatic moiety such as a phenyl moiety such as is found in polyethersulphones. Said polymeric backbone preferably does not include any —S— moieties. Said polymeric backbone preferably does not include any nitrogen atoms. Said polymeric backbone preferably consists essentially of carbon atoms, preferably in the form of C—C single bonds.

Said —O— moieties are preferably directly bonded to the polymeric backbone.

Said optionally cross-linked first polymeric material preferably includes, on average, at least 10, more preferably at least 50, —O— moieties pendent from the polymeric backbone thereof. Said —O— moieties are preferably a part of a repeat unit of said first polymeric material.

Preferably, said —O— moieties are directly bonded to a carbon atom in said polymeric backbone of said first polymeric material, suitably so that said first polymeric material includes a moiety (which is preferably part of a repeat unit) of formula:

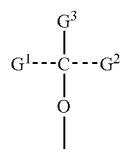

II where $G^1$ and $G^2$ are other parts of the polymeric backbone and $G^3$ is another moiety pendent from the polymeric backbone. Preferably, $G^3$ represents a hydrogen atom.

Preferably, said first polymeric material includes a moiety

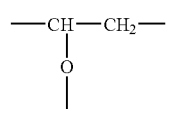

III

Said moiety III is preferably part of a repeat unit. Said moiety III may be part of a copolymer which includes a repeat unit which includes a moiety of a different type compared to moiety III. Suitably, at least 60 mole %, preferably at least 80 mole %, more preferably at least 90 mole % of said first polymeric material comprises repeat units which comprise (preferably consist of) moieties III. Preferably, said first polymeric material consists essentially of repeat units which comprise (preferably consist of) moieties III.

Suitably, 60 mole %, preferably 80 mole %, more preferably mole %, especially substantially all of said first polymeric material comprises vinyl moieties.

Preferably, the free bond to the oxygen atom in the —O— moiety pendent from the polymeric backbone of said first polymeric material (and preferably also in moieties II and III) is bonded to a group $R^{10}$ (so that the moiety pendent from the polymeric backbone of said first polymeric material is of formula —O—$R^{10}$). Preferably group $R^{10}$ comprises fewer than 10, more preferably fewer than 5, especially 3 or fewer carbon atoms. It preferably only includes atoms selected from carbon, hydrogen and oxygen atoms. $R^{10}$ is preferably selected from a hydrogen atom and an alkylcarbonyl, especially a methylcarbonyl group. Preferably moiety —O—$R^{10}$ in said polymeric material AA is an hydroxyl or acetate group.

Said first polymeric material may include a plurality, preferably a multiplicity, of functional groups (which incorporate the —O— moieties described) suitably selected from hydroxyl and acetate groups. Said polymeric material preferably includes at least some groups wherein $R^{10}$ represents an hydroxyl group. Suitably, at least 30%, preferably at least 50%, especially at least 80% of groups $R^{10}$ are hydroxyl groups. Said first polymeric material preferably includes a multiplicity of hydroxyl groups pendent from said polymeric backbone; and also includes a multiplicity of acetate groups pendent from the polymeric backbone.

The ratio of the number of acetate groups to the number of hydroxyl groups in said first polymeric material is suitably in the range 0 to 3, is preferably in the range 0.1 to 2, is more preferably in the range 0.1 to 1.

Preferably, substantially each free bond to the oxygen atoms in —O— moieties pendent from the polymeric backbone in said first polymeric material, except for any free bonds which are involved in optionally cross-linking the first polymeric material, is of formula —O—$R^{10}$ wherein each group —$OR^{10}$ is selected from hydroxyl and acetate.

Preferably, said first polymeric material includes a vinyl alcohol moiety, especially a vinyl alcohol moiety which repeats along the backbone of the polymeric material. Said first polymeric material preferably includes a vinyl acetate moiety, especially a vinylacetate moiety which repeats along the backbone of the polymeric material.

Polyvinylalcohol is generally made by hydrolysis of polyvinylacetate. Said first polymeric material may comprise a 0-100% hydrolysed, suitably a 5 to 95% hydrolysed, preferably a 60 to 95%, more preferably a 70 to 95%, especially a 80 to 90%, hydrolysed polyvinylacetate Said first polymeric material may have a number average molecular weight (Mn) of at least 10,000, preferably at least 50,000, especially at least 75,000. Mn may be less than 500,000, preferably less than 400,000. Said first polymeric material is preferably a polyvinyl polymer. Said first polymeric material may be a copolymer.

Said first polymeric material is preferably a polyvinyl alcohol polymer or copolymer.

Preferably, said first polymeric material includes at least one vinyl alcohol/vinyl acetate copolymer which may include greater than 5%, suitably includes greater than 30%, preferably greater than 65%, more preferably greater than 80% of vinyl alcohol moieties.

Said first polymeric material may be a random or block copolymer.

Preferably, said first polymeric material is not cross-linked.

When however said first polymeric material is cross-linked, it may comprise a polymeric material formed by reaction of a said first polymeric material and a second material which includes a functional group which is able to react in the presence of said first polymeric material to cross-link said first polymeric material and form a third polymeric material.

Preferably, formation of said third polymeric material from said first polymeric material and second material involves a condensation reaction. Preferably, formation of said third polymeric material involves an acid catalysed reaction.

Preferably, said first polymeric material and second material include functional groups which are arranged to react, for example to undergo a condensation reaction, thereby to form said third polymeric material. Preferably, said first polymeric material and second material include functional groups which are arranged to react for example to undergo an acid catalysted reaction thereby to form said third polymeric material.

Said second material may be an aldehyde, carboxylic acid, urea, acroleine, isocyanate, vinyl sulphate or vinyl chloride of a diacid or include any functional group capable of condensing with one or more groups on said first polymeric material. Examples of the aforementioned include formaldehyde, acetaldehyde, glyoxal and glutaraldehyde, as well as maleic acid, oxalic acid, dimethylurea, polyacroleines, diisocyanates, divinyl sulphate and the chlorides of diacids.

Said second material is preferably an aldehyde containing or generating compound. Preferably, said second material is an aldehyde containing compound and more preferably includes a plurality of aldehyde moieties. Said aldehyde containing compound may be of formula IV as described in WO98/12239 the content of which is incorporated herein for WO2006/106300.

According to a second aspect of the invention, there is provided a system associated with a wellbore, the system comprising:

a receptacle for containing a treatment formulation;
conduit means extending from the receptacle and being arranged to deliver treatment formulation from the receptacle to a position wherein it contacts reservoir fluid.

The wellbore suitably includes a wellbore pump.

Preferably, the conduit means is arranged to introduce treatment formulation into the wellbore from an input position, wherein the input position is on an imaginary vertical line which is horizontally spaced from the inlet of the wellbore pump by a distance of less than 500 m, preferably less than 25 m, more preferably less than 10 m.

Preferably, the receptacle contains a treatment formulation which comprises a first polymeric material which is optionally cross-linked as described according to the first aspect.

The system may include means for collecting fluid extracted from the wellbore by the wellbore pump and for allowing separation of liquid hydrocarbons from said treatment formulation.

The system of the second aspect may have any feature described with reference to the method of the first aspect. The system may be for carrying out the method of the first aspect.

In a third aspect, there is provided the use of an optionally cross-linked first polymeric material as described according to the first aspect for treating a wellbore for improving the performance or efficiency of a wellbore pump and/or for increasing the rate of production of reservoir fluid from a reservoir which communicates with the wellbore.

Any feature of any aspect of any invention or embodiment described herein may be combined with any feature of any aspect of any other invention or embodiment described herein mutatis mutandis.

BRIEF DESCRIPTION OF THE DRAWINGS

Specific embodiments of the invention will now be described, by way of example, with reference to the following drawings, in which.

DETAILED DESCRIPTION OF PREFERRED EMBODIMENTS

Figure 1:
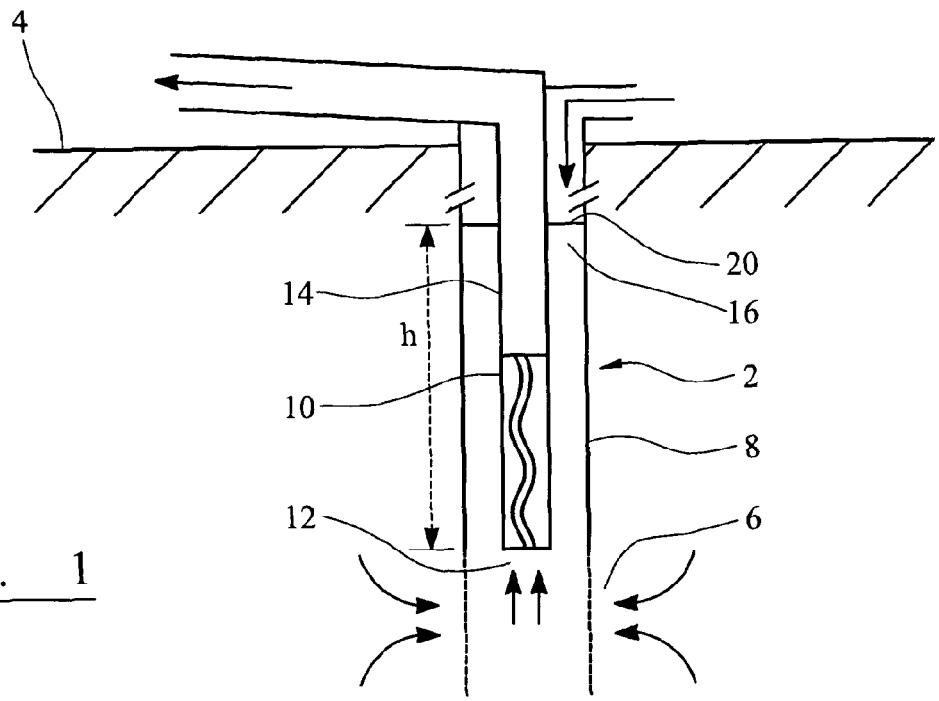
FIG. 1 is a schematic representation of an oil well.

Referring to FIG. 1, an oil well includes a wellbore 2, below ground level 4, which extends to an oil reservoir 6. The wellbore includes a casing 8 within which is arranged a progressing cavity pump (PCP) 10 which includes an inlet 12 at its lower end and is connected at its upper end to production tube 14. An annulus 16 is defined between the pump 10/tube 14 and the casing 8. The annulus communicates with the reservoir and includes a head 20 of reservoir fluid. A water based formulation as hereinafter described can be poured down the annulus 16 and pass under gravity to the reservoir 6, immediately upstream of inlet 12. The formulation may improve the performance and efficiency of the pump 10 due to its ability to increase the mobility of the oil in the reservoir immediately upstream of the pump 10 and/or enhance the ability of the oil to enter the pump inlet. Furthermore, by improving mobility and/or reducing the level of back pressure when the oil enters the pump inlet (or any other constriction) the rate of flow of oil from the reservoir into the wellbore may be increased resulting in an increased rate of oil production.

The water-based formulation comprises a 0.5 wt % aqueous solution of a 88% hydrolysed polyvinylalcohol having a molecular weight of 180,000. This may be commercially available or may be made by known methods which may involve diluting more concentrated polyvinylalcohol solutions.

Figure 2:
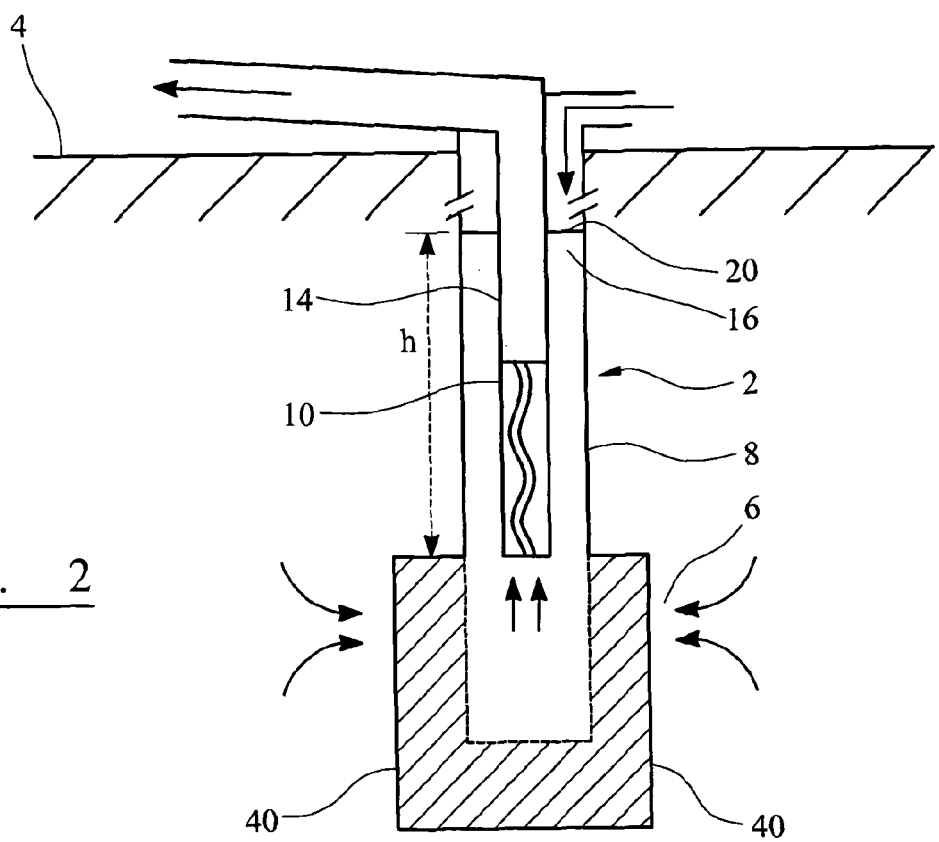
FIG. 2 is a view similar to that of FIG. 1 except the well includes a sand pack.

In a variation on the FIG. 1 embodiment, a wellbore may include an associated sand pack 40 as shown in FIG. 2. The sand pack effectively filters sand particles from oil as oil passes from the reservoir into the wellbore to prevent such sand particles passing into pump 10 and passing to the surface. However, the sand pack acts as a constriction to the passage of oil into the wellbore, since the oil must pass through the openings of the sand pack to enter the wellbore.

The arrangement of FIG. 2 may be treated with the water-based formulation as described for Example 1. In this case, it is found that the performance and/or efficiency of pump 10 may be improved, and the rate of oil production may also be increased.

The use of the treatment formulation is believed to facilitate passage of reservoir fluid including oil through orifices (or other constrictions) for example through pump inlets and sand packs by reducing surface tension of the oil and/or interfacial tension between the oil and walls which define constrictions. By reducing the effective friction between the oil and walls which define constrictions, the oil may more easily pass through the constrictions into the wellbore and/or pump. As a result, the rate of flow of oil from the reservoir into the wellbore may be increased and/or the efficiency of wellbore pumps may be improved, possibly allowing pump speeds to be increased.

Whilst the applicant does not wish to be bound by any theory, it is believed that the effect the aqueous formulation has to improve "slip" of the oil relative to solid bodies (such as walls which define constrictions) may be illustrated by the simple experiment described in Example 1.

Example 1

A 500 ml stoppered jar containing 125 ml of an aqueous formulation comprising 0.5 wt % of polyvinylalcohol as described above was selected and the formulation manually swirled around so that it wetted the walls of the jar. Then 250 ml of crude oil was poured on top of the aqueous formulation with minimum agitation. The jar was then manually lifted and rocked from side to side and the fluid therein caused to gently swirl around the jar. It was observed that the oil was very mobile and did not stick to the jar wall.

The process described was repeated except that tap water alone was used instead of the polyvinylalcohol-containing aqueous formulation. In this case, the oil was observed to be far less mobile and furthermore globules and/or patches of oil stuck to the jar wall. Thus, it is clear that use of the aqueous formulation significantly increases oil mobility.

Not all wells can be treated as aforesaid to improve performance and efficiency of pumps and, accordingly, appropriate wells need to be selected for treatment. Factors which may affect whether a well can advantageously be treated using the method described are discussed below.

(a) A very high head 20 in the annulus may indicate that the pump 10 is working at less than the optimum.

(b) In the absence of taking steps to stimulate the reservoir, for successful application of the method the reservoir should preferably be capable of yielding more oil if pumps can be run at greater efficiencies and/or higher pump speeds. This is not always the case. Some pumps are well matched to reservoirs, which are delivering at their maximum rate. In these cases no improvement in pump performance will yield more oil. Indeed, increasing pump rates/performance may result in the preferential extraction of water from the reservoir rather than oil. However, in some cases, the reservoir itself may be stimulated by the treatment described to produce more oil. For example, when a wellbore includes an associated sandpack (or oil is otherwise constricted from entering a pump inlet), use of the aqueous formulation may reduce a back pressure on the reservoir caused by the presence of the sandpack (or other constriction) and, as a result, use of the aqueous formulation may stimulate the reservoir to yield more oil.

(c) Provided a reservoir can produce more oil with an increase in pump efficiency and/or pump revolutions/strokes per minute (rpm), and/or via stimulation, then the maximum increase in total production is given by:

$$\text{Maximum increase} = IP \times \text{pump intake pressure}$$

wherein IP is the production index, defined as $$\frac{Q}{(\text{reservoir pressure} - \text{pump intake pressure})}$$

where Q is the rate of fluid production from the reservoir in barrels per day and all pressures are in pounds per square inch (psi).

The pump intake pressure can be calculated from $$\text{Pump intake pressure} = rho \times g \times h,$$

where h is the height of the hydrostatic head of fluid above the pump intake (FIG. 1), g is the acceleration due to gravity and rho is the density of the fluid above the pump. The units for rho, g and h are selected to yield a pump intake pressure in psi.

The above equation is for a fluid at a pump intake pressure above the bubble point. If the pump intake pressure is lower than the bubble point, gas may be released from the oil, which may damage the performance of the pump or at best invalidate the equation defining IP.

(d) The pump may have a bottleneck at its suction point, related to the low mobility of the oil, i.e. the low mobility is preventing the pump from working at higher efficiencies and at higher rotation speeds. If limitations are due to worn out pumps, or oil mobility does not provide the limitation, using the method described may not help.

(e) The maximum increase in oil mobility may be seen for a high viscosity oil in a cold reservoir.

(f) It is desirable to have low BS&W (basic sediment and water) in order that the extra fluid produced is rich in oil, and therefore more valuable.

(g) The water-based formulation is suitably capable of increasing the mobility of the oil at the entry to the pump and/or through other constrictions.

(h) The water-based formulation may increase mobility above the pump in order to minimize back pressure on the pump.

(i) The pump is preferably in good condition as determined by manometric tests. Worn out pumps may slip badly with the water-based formulation and deliver less oil than anticipated.

(j) The installed pump is suitably running at low volumetric efficiency and have the potential to be increased. Preferably, volumetric efficiency (prior to application of the method), calculated from field production rates at known pump speeds, should be below 60%. This parameter is not a true energy efficiency, but is taken as an indicator of the ability of the water-based formulation to increase the performance of the reservoir and pump assembly. It should be interpreted in combination with the pump intake pressure (point (c)).

(k) When exposed to increased drawdown by the pump, the producing zone must not produce significant additional water.

It should be noted that the object of practising the method described is not solely to lower the height of head 20 as much as possible since there does need to be some head in order to preventing ress of air or gas into the pump intake, which could damage the pump. In addition, for some pumps, the delivery of the water based formulation to the annulus will result in an increase in the level of fluid, above the pump, which is in hydraulic contact with the reservoir. This fluid above the pump has the effect of applying a hydrostatic pressure on the reservoir at the point of hydrocarbon production, the effect of which is to act against the tendency of the reservoir to produce fluid, i.e. to limit the rate of oil production. This means that the rate of delivery of the water-based formulation should be optimised to minimise factors that work against the increase of oil production.

Furthermore, the object of practising the method described is not solely to increase oil mobility the maximum amount possible. This is because for some pumps (e.g. PCP's), if the frictional force between the fluid entering the pump and the pump itself is too low, the fluid may slip inside the pump as the rotor is turned which leads to reduced pump efficiency. This effect can be compounded with pumps designed to accommodate sand production accompanying oil production (as in CHOPS). In such cases, the gaps between rotor and stator are necessarily large, leading to an increased slip of low friction fluids. Careful control of fluid compositions and delivery rates may therefore be important.

In applications of the method described, a water based formulation will be delivered to a pump inlet and it will be necessary for the pump to carry this added fluid to the surface. The resulting improvement in pump performance must be such as to allow the pump speed to be increased by a proportion which is sufficient to accommodate the additional fluid delivered and still transport produced oil.

The ratio of formulation to oil will have to be optimized on a well-by-well basis, in order to achieve maximum oil production. Suitably, the formulation will be delivered at between 60:40 Oil:Formulation through to 95:5 Oil:Formulation, preferably in the range 70:30 to 85:15.

Details of field trials to illustrate use of the method are described in Examples 2 and 3 below.

Example 2

A candidate well was selected, based on an assessment of the factors described in (a) to (k) above, as having high potential for an increase in oil production rate by treatment with the water-based formulation described. The well had a sand control barrier. The initial oil production rate of the well was approximately 48 BPD.

A 0.5 wt % polyvinylalcohol aqueous solution was introduced into the annulus by simply pouring it down the annulus. The delivery rate was optimised over a four day period by trial and error. The table below shows data for two situations. One is the case where no aqueous solution was introduced (i.e. a baseline). The second case is for when the aqueous solution was introduced at an optimised rate of 23 BPD.

| Title | Pump Speed RPM | Aqueous solution rate BPD | Torque Lb·ft | WHP psi | Oil Rate BPD | Pump Efficiency % |
|---|---|---|---|---|---|---|
| Baseline | 206 | 0 | 248 | 50 | 48.3 | 43 |
| Trial | 275 | 23 | 211 | 16 | 76 | 59.5 |

In summary, it was found that delivery at the optimum rate resulted in the following:
  i. the ability to increase the pump speed by 34% from 206 RPM to 275 RPM.
  ii. a greater than 55% increase in oil production from 48 BPD to 76 BPB. This increase of 28 BPD is greater than would be predicted by using the aforementioned equation (maximum increase=IP×pump intake pressure). This implies the IP has been increased by the treatment which indicates the productivity of the near wellbore reservoir has been improved.
  iii. an increase in the volumetric efficiency of the pump from 43% to almost 60%
  iv. a 15% reduction in pump torque from 248 lb·ft to 211 lb·ft
  v. a 68% reduction in wellhead pressure (WHP) from 75 psi to 16 psi After completion of the trial, the pump rate was returned to a low rate (206 RPM) and the hydrocarbon production rate was observed to return to its initial low value of approximately 50 BPD.

Example 3

A candidate well was selected, based on an assessment of the factors described in (a) to (k) above, as having high potential for reduction in downhole pump torque and wellhead pressure by treatment with the water-based formulation described. In this case, the well had no sand pack. The initial oil production rate of the well was approximately 109 BPD.

A 0.7 wt % polyvinylalcohol aqueous solution was introduced into the annulus at a delivery rate of 26 BPD. After a period of 8 hours delivering the formulation at 26 BPD, with the downhole pump set at 90 RPM, the downhole pump speed was increased to 110 RPM for the duration of the trial.

Figure 3:
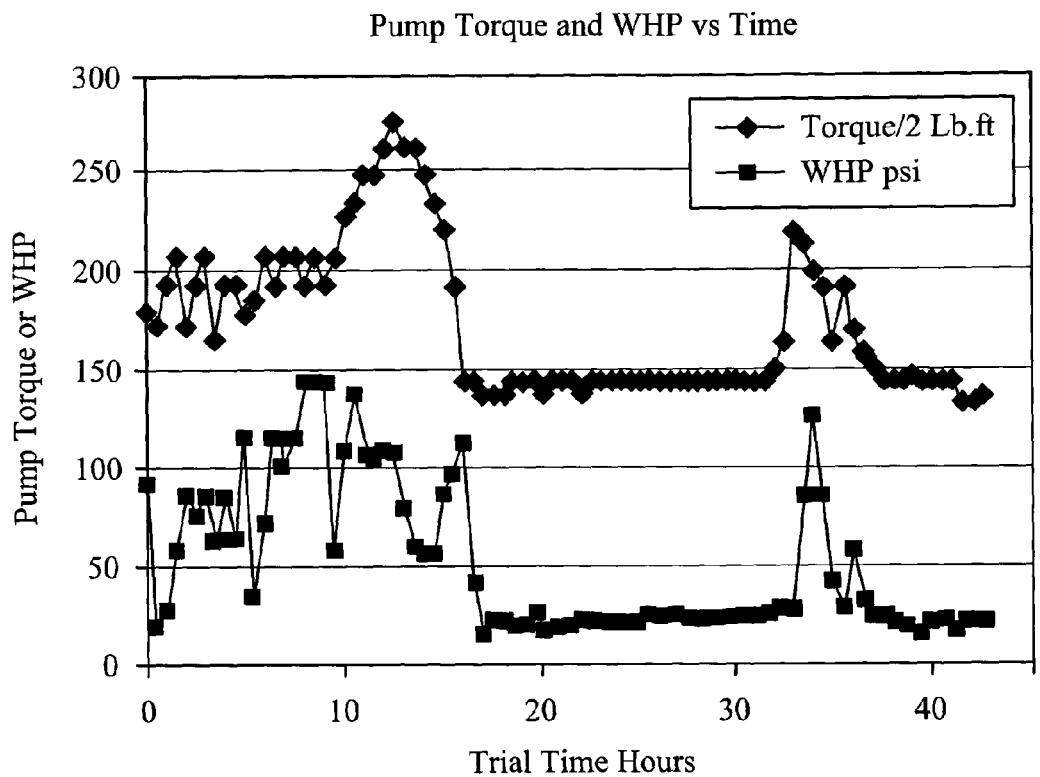
FIG. 3 is a graph illustrating results for Example 3.

FIG. 3 shows the changes in pump torque (Lb·ft) and wellhead pressure (psi) as a function of time as the formulation was being delivered. The measured values of pump torque are divided by 2 in order to scale the data so both torque and wellhead pressure can be shown on one figure. Time zero is the time at which the delivery of the formulation began.

FIG. 3 shows that there is an initial period of up to 15 hours, during which both pump torque and wellhead pressure vary erratically, finally stabilising to levels that are 25% and 70% less than their starting values. However, during the trial, the pump delivering aqueous formulation was turned off after about 20 hours for a 3 hour period. As a result the pump torque and the wellhead pressure rose at about 30 hours but returned to a lower level later. This clearly illustrates how, in the absence of the water-based formulation, pump torque is higher.

The water-based formulations may be advantageously used with PCPs as described above. In addition, it is noted that such water-based formulations generally will not attack PCP stators which are lined with rubber or elastomers, in contrast to organic solvents which could attach stators. Thus, it is believed that the water-based formulation will not contribute to wear or degradation of the stators or materials from which they are made.

The water-based formulations may also be used to improve performance or efficiency of beam pumps. Factors affecting performance/efficiency and the application of the water based formulation may be generally as described for PCPs as described above.

As described above, the water-based formulation may simply be poured down the annulus and because the formulation generally has a density which is greater than that of the oil in the annulus it will fall under gravity and travel to the bottom of the annulus to a position adjacent the inlet of the pump. The presence of the formulation in this region enhances the ability of the oil to enter the inlet of the pump. It will be appreciated that intimate mixing of oil and formulation is unlikely to take place adjacent the inlet because in the embodiment described no means is provided for encouraging mixing.

In some wells, the annulus may be interrupted, for example by a packer or other device introduced to isolate geological zones of the well and/or to stabilise regions of the well, and consequently it will not be possible to simply pour formulation down the annulus. In this case, a tube may be inserted down the annulus and through any packer or other device which otherwise blocks the annulus, the tube being arranged to deliver formulation to the reservoir at a position adjacent the inlet of the pump.

Figure 4:
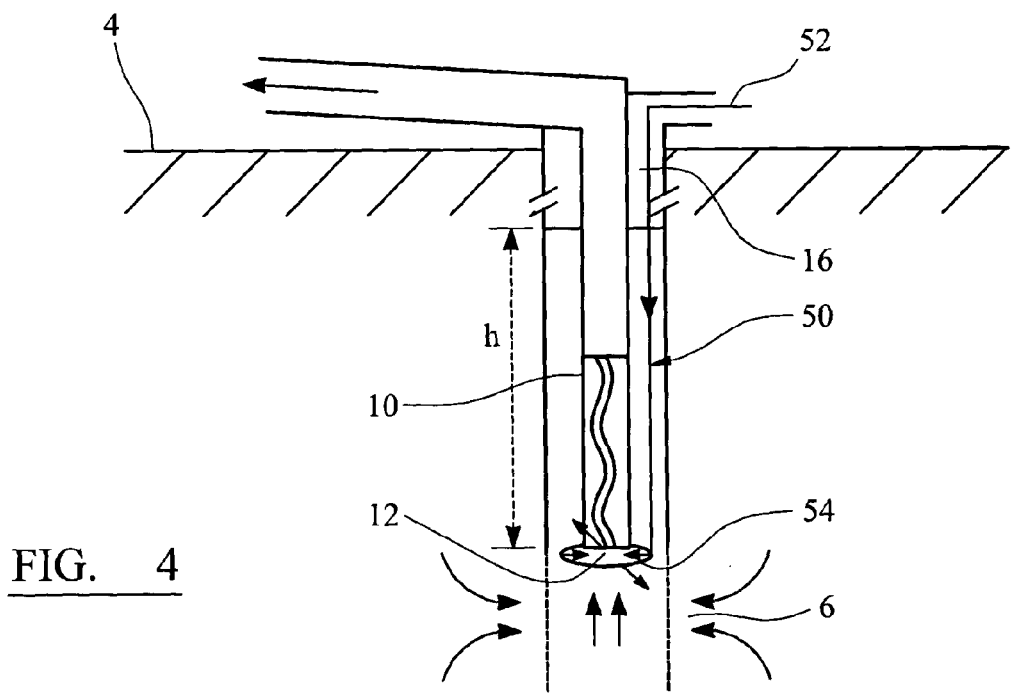
FIG. 4 is a schematic representation of an oil well including an alternative means of delivering an aqueous formulation thereinto.

In another embodiment a more complex fluid delivery apparatus may be provided for delivering formulation to the reservoir. Referring to FIG. 4, a delivery apparatus 50 is shown extending down the annulus 16 from above ground level 4 to the inlet 12 of the pump 10. The apparatus 50 includes an elongate tube 52 extending from above ground level, through any packer or other obstruction (none being shown) to a toroidal tube 54 which surrounds the inlet 12 of the pump. The toroidal tube includes an array of openings (not shown) via which fluid may exit the apparatus. The openings are arranged so that fluid exiting the tube can be relatively evenly delivered around the inlet.

The apparatus may be arranged to provide an additional force to actively draw hydrocarbon from the reservoir. This may be achieved by flowing the formulation through nozzles or jets connected to the toroidal tube, which can accelerate the rate of hydrocarbon flow via the venturi effect.

Furthermore, the formulation may suitably be delivered at above the hydrostatic pressure experienced at the pump inlet which is preferably above the bubble point of the oil.

In each of the embodiments described above, the delivery rate of formulation through the apparatus may be controlled according to the oil production rate and the ratio of oil to formulation. For oil wells producing between 10 BPD and 500 BPD, the expected delivery rates for the formulation will be 0.25 liters/minute to 10 liters/minute. Internal diameters of delivery tubing would be in the range 0.1 inches to 0.8 inches, preferably 0.2 inches to 0.5 inches.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of increasing the rate of production of reservoir fluid from a reservoir which includes a wellbore pump, wherein said wellbore pump is arranged to pump wellbore fluid within the wellbore to a surface, said method comprising the steps of:
   (a) selecting a wellbore which includes an associated wellbore pump, said wellbore pump being associated with a production tube and being arranged within a casing, wherein an annulus is defined between the casing and the pump/production tube, said annulus including reservoir fluid which has a hydrostatic head which is at least 15 m above the level of an inlet of the wellbore pump;
   (b) contacting a reservoir fluid in said annulus upstream of an inlet of the wellbore pump with a treatment formulation, wherein said treatment formulation comprises a first polymeric material which includes —O— moieties pendent from a polymeric backbone thereof, wherein the first polymeric material is optionally cross-linked; and
   (c) operating said wellbore pump to recover liquid hydrocarbons from the wellbore at a rate which is greater after contact with said treatment formulation compared to the rate of recovery of liquid hydrocarbons before contact with said treatment formulation
   (d) wherein, in step (b) said treatment formulation is caused to move from a first position, spaced from the inlet of the wellbore pump, towards a second position defined by the inlet of the wellbore pump, said treatment formulation being arranged to move along a fluid path which extends within the wellbore on moving towards said second position;
   (e) wherein a force is incident upon the treatment fluid to cause it to move between the said first and second positions, wherein at least 80% of said force is provided by gravity.

2. The method according to claim 1, the method comprising lowering the height of said hydrostatic head of reservoir fluid in said wellbore annulus.

3. The method according to claim 1, wherein said hydrostatic head is at least 30 m above the level of the inlet of the wellbore pump.

4. The method according to claim 1, wherein said treatment formulation is introduced into the wellbore from an input position, wherein the input position is on an imaginary vertical line which is spaced horizontally from the inlet of the wellbore by a distance of less than 500 m.

5. The method according to claim 1, wherein a filtration device is associated with the wellbore, upstream of the wellbore pump.

6. The method according to claim 1, wherein said wellbore pump is selected from a progressing cavity pump, a beam pump and a centrifugal pump.

7. The method according to claim 1, wherein in step (a) the method comprises: selecting a wellbore having a hydrostatic head in the annulus which is less than 300 m above said level; or selecting a wellbore associated with a reservoir which is capable of yielding more oil if the rate of flow through the wellbore can be increased; or selecting a wellbore having a wellbore pump having a volumetric efficiency of less than 60%; or selecting a wellbore wherein oil in the wellbore has a viscosity in the range 2000 to 50000 cp.

8. The method according to claim 1, wherein said treatment formulation includes at least 0.1 wt % of said optionally cross-linked first polymeric material and less than 5 wt % of said optionally cross-linked first polymeric.

9. The method according to claim 1, wherein said treatment formulation includes
- 0.1 to 3 wt % of said optionally cross-linked polymeric material;
- 0 to 20 wt % of dissolved or dispersed components in addition to said optionally cross-linked polymeric material;
- 77 to 99.9 wt % water.

10. The method according to claim 1, wherein said first polymeric material includes a moiety

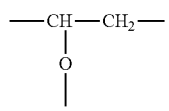
III

11. The method according to claim 1, wherein said first polymeric material includes a plurality of functional groups selected from hydroxyl and acetate groups.

12. The method according to claim 1, wherein said first polymeric material includes a multiplicity of hydroxyl groups pendant from a polymeric backbone; and also includes a multiplicity of acetate groups pendant from the polymeric backbone.

13. The method according to claim 1, wherein said first polymeric material includes a vinyl alcohol moiety.

14. The method according to claim 1, wherein said first polymeric material comprises a 5 to 95% hydrolysed polyvinyl acetate.

15. The method according to claim 1, wherein said first polymeric material is not cross-linked.

16. The method according to claim 1, wherein use of said treatment formulation increases the rate of flow of fluid passing from the reservoir into the wellbore.

17. The method according to claim 1, wherein said first polymeric material is not cross-linked and comprises 70 to 95% hydrolysed polyvinylacetate.

18. The method according to claim 1, wherein the ratio of the volume of reservoir fluid to the volume of treatment formulation is in the range of 70:30 (reservoir fluid formulation) to 85:15.

* * * * *